United States Patent
Zhao et al.

(10) Patent No.: US 9,603,075 B2
(45) Date of Patent: Mar. 21, 2017

(54) METHOD, DEVICE AND SYSTEM FOR RECONFIGURING AGGREGATION CELL

(75) Inventors: Yi Zhao, Beijing (CN); Jing Liang, Beijing (CN); Jiamin Liu, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 337 days.

(21) Appl. No.: 13/390,105

(22) PCT Filed: Sep. 15, 2010

(86) PCT No.: PCT/CN2010/076948
§ 371 (c)(1),
(2), (4) Date: Feb. 11, 2012

(87) PCT Pub. No.: WO2011/032497
PCT Pub. Date: Mar. 24, 2011

(65) Prior Publication Data
US 2012/0142361 A1  Jun. 7, 2012

(30) Foreign Application Priority Data
Sep. 18, 2009 (CN) .......................... 2009 1 0092584

(51) Int. Cl.
H04W 40/00 (2009.01)
H04W 36/28 (2009.01)
H04W 72/02 (2009.01)

(52) U.S. Cl.
CPC ............ *H04W 36/28* (2013.01); *H04W 72/02* (2013.01)

(58) Field of Classification Search
CPC ..... H04W 16/00; H04W 16/18; H04W 16/24; H04W 24/02; H04W 36/28; H04W 72/02
(Continued)

(56) References Cited

U.S. PATENT DOCUMENTS
2010/0296488 A1* 11/2010 Kuo .............................. 370/332

FOREIGN PATENT DOCUMENTS
CN  10112484 A  2/2008
CN  101124841 A  2/2008
(Continued)

OTHER PUBLICATIONS
International Search Report issued International Application No. PCT/CN2010/076948, dated Dec. 30, 2010.
(Continued)

*Primary Examiner* — Amancio Gonzalez
(74) *Attorney, Agent, or Firm* — Handal & Morofsky, LLC

(57) ABSTRACT

The present invention provides a method for reconfiguring an aggregated cell, which includes that: a network side device judges whether the aggregated cell of a user equipment (UE) needs to be changed in the cell set in which the carriers can be aggregated; when the judgment result is that the change is needed, the network side device transmits a radio resource control (RRC) connection reconfiguration message to the UE, and the RRC connection reconfiguration message carries the change information of the aggregated cell of the UE; the UE receives the RRC connection reconfiguration message, and reconfigures the aggregated cell according to the RRC connection reconfiguration message. In the present invention, for the LTE-A system, when the aggregated cell of UE which supports the carrier aggregation changes within the same cell set in which the carriers can be aggregated, the aggregated cell of the UE can be reconfigured; and the same access stratum (AS) key is used to perform the security processing procedure for the data, which enables the uninterrupted transmission for the data.

27 Claims, 7 Drawing Sheets

(58) Field of Classification Search
USPC .................................................. 455/446
See application file for complete search history.

(56) References Cited

FOREIGN PATENT DOCUMENTS

| CN | 101203034 A | | 6/2008 |
|---|---|---|---|
| CN | 101400143 A | * | 4/2009 |
| CN | 101808374 A | | 8/2010 |
| CN | 101827369 A | | 9/2010 |
| WO | 2008054320 A2 | | 5/2008 |
| WO | 2010105145 A1 | | 9/2010 |

OTHER PUBLICATIONS

Office Action issued in Chinese patent application No. 200910092584.9, dated Jan. 16, 2013 (In Chinese).
Office Action issued in Chinese patent application No. 200910092584.9, dated Jan. 16, 2013 (In English).
R2-094186; 3GPP TSG RAN WG2#67; Panasonic, System information acquisition at the start of carrier aggregation, Shenzhen, China, Aug. 24-28.
R2-094240; 3GPP TSG RAN2 Meeting #67; NEC; Component carrier configuration/activation for carrier aggregation; Shenzhen, China, Aug. 24-28, 2009.
R2-094626; 3GPP TSG-RAN WG#67; NEC; Mobility and Carrier Aggregation Signaling; Shenzen, China, Aug. 24-28, 2009.
European Patent Office, Extended European Search Report, European Patent Application No. 10816701.6, Jan. 12, 2017.
LG Electronics, "Initial Access Procedure in Let-Advanced", 3GPP TSG RAN WG1 Meeting #56, R1-090779, Feb. 9-13, 2009, Athens, Greece.
NEC, "Higher Layer Functions to Support Carrier Aggregation", 3GPP TSG RAN WG2 #66, R2-093287, May 4-8, 2009 San Francisco, USA.
NEC, "Component carrier configuration/activation for carrier aggregation", 3GPP TSG RAN WG2 Meeting #66bis, R2-093697, Jun. 29-Jul. 3, 2009, Los Angeles, USA.
Huawei, "Component Carrier Management with DRX Consideration in LTE-Advanced", 3GPP TSG RAN WG2 Meeting #66bis, R2-093922, Jun. 29-Jul. 3, 2009, Los Angeles, USA.
Panasonic, "System information acquisition at the start of carrier aggregation", 3GPP TSG RAN WG2 #67, R2-094186, Aug. 24-28, 2009, Shenzhen, China.
NEC, "Mobility and Carrier Aggregation Signaling", 3GPP TSG-RAN WG2 #67, R2-094626, Aug. 24-28, 2009, Shenzhen, China.

* cited by examiner

METHOD, DEVICE AND SYSTEM FOR RECONFIGURING AGGREGATION CELL

The present application claims the priority of the Chinese patent application, with the application date of Sep. 18, 2009, the application number of 200910092584.9, and the patent name of "Method, device and system for reconfiguring aggregated cell", all content of the priority application is combined into the present application by quoting.

FIELD OF THE PRESENT INVENTION

The present invention relates to the technical field of communications, and more particularly to method, device and system for reconfiguring aggregated cell.

BACKGROUND OF THE PRESENT INVENTION

LTE (Long Term Evolution) is the evolution of 3G (3rd Generation), LTE ameliorating and enhancing the air access technology of 3G, using OFDM (Orthogonal Frequency Division Multiplexing) and MIMO (Multiple Input Multiple Output) as the only standard of the evolution of wireless network. In 20 MHz spectrum bandwidth, LTE can provide the peak rate of downlink is 100 Mbit/s and the peak rate of uplink is 50 Mbit/s, ameliorating the performance of cell edge users, improving cell capability and reducing system delay. The characteristics of LTE include high data rate, packet transmission, low delay, extensive field coverage and downward compatibility. In LTE system, UE (User Equipment) working in one carrier at the same time, while one LTE cell having only one carrier, each LTE cell identified by only one number in network.

In addition, with the rapid growth of the number of mobile user, traffic of mobile user increases exponentially. To satisfy the continuously increased traffic requirements of mobile user, it is need to provide more larger bandwidth for traffic transmission of mobile user and higher peak rate which applications requires. LTE-A (LTE-Advanced) system provides large bandwidth for mobile user, by introducing carrier aggregation technology to improve peak rate for mobile user.

The security of AS (Access Stratum) for LTE system comprise RRC(Radio Resource Control) signalling integrality protection, RRC signalling encryption protection and user data encryption; the RRC signalling is SRB (Signalling Radio Bearer), comprising SRB0, SRB1 and SRB2; the user data is DRB (Data Radio Bearer). SRB1 and SRB2 have the same integrality protection algorithm for RRC signalling integrality protection; encryption algorithm is all the same for all bearers (i.e. SRB1, SRB2 and DRB); integrality protection and encryption operation are not needed for SRB0. Furthermore, the parameters of encryption operation include encryption algorithm and encryption key; the parameters of integrality protection include integrality protection algorithm and integrality protection key.

A network architecture of LTE system as shown in FIG. 1, the network side entity of the LTE system comprise MME (Mobile Management Entity)/S-GW (Serving Gateway), eNB (enhanced Node B) and so on. The interface between eNB and eNB is interface X2. The interface between MME/S-GW and eNB is interface S1. Each eNB includes multiple cells, and each cell can be determined by PCI (Physical Layer ID) of cell and corresponding downlink carrier frequency. For describing conveniently, different cells are determined by {PCI, downlink carrier frequency} in following content. The {PCI, downlink carrier frequency} is the unique identifier in certain field.

Further, because LTE system is covered by cells with single frequency layer, when UE detected a cell corresponding to another {PCI, downlink carrier frequency}, and the signal of this cell is better than that of the serving cell of UE, then it is considered that the UE has moved to the edge of serving cell (cell with better signal). At the moment, it is necessary to perform handover so that the ongoing service won't be interrupted, that is, UE need to move from one cell to another cell.

In LTE system, the above encryption algorithm and integrality algorithm will be changed when UE is switched to another cell from one cell, that is, it is necessary to change the encryption key of RRC signalling, encryption key of user data and integrality protection key of RRC signalling for each handover.

But in present technology, because of the change of AS key (the above encryption key of RRC signalling, encryption key of user data and integrality protection key of RRC signalling) when UE is switched from one cell to another cell, it is necessary to perform re-establishment for PDCP (Packet Data Convergence Protocol) entity, RLC (Radio Link Control) entity, MAC (Media Access Control) entity etc. In the procedure of re-establishing the above entities, it is unable to send or receive data between the network side and UE, thus the procedure of transmitting data may be interrupted and the data may be missing.

In addition, in consideration that each cell only has one (or a pair) carrier in LTE system, and UE only can perform the procedure of data receiving and transmitting in only one cell at the same time, the carrier aggregation technology is adopt to the LTE-A system for supporting wider transmission bandwidth to provide higher transmission rate. There are multiple cells in which UE receives and sends data through carrier aggregation technology at the same time in the same geographic location, and each cell at least include one (or a pair) carrier(s) which can be used to transmit data independently. The multiple aggregated cells can use the same PCI, while the carrier frequency of each cell is different. UE can receive and transmit data in multiple (or multiple pairs) carrier of multiple cell sets in which the carriers can be aggregated at the same time, so as to improve data transmission rate.

As can be seen, the change of the corresponding aggregated cell of UE in the carrier aggregation technology of LTE-A system is not taken into account in present technology, that is, there is not corresponding processing mechanism when the corresponding aggregated cell of UE changes.

To sum up we can see, there are at least the disadvantages below in present technology:

When UE detected the cell with different PCI or frequency, UE considers that the cell with different geography location appears. When the signal of serving cell and other cells with different {PCI, downlink carrier frequency} satisfies handover condition(s), it will perform handover procedure and recalculate AS key and re-establish PDCP, RLC, MAC entities, with the result that too many problems of data transmission interrupt and data loss caused by handover. In addition, there is no mechanism for the change of aggregated cell in present technology.

SUMMARY OF THE PRESENT INVENTION

The present invention provides a method, device and system for reconfiguring the aggregated cell in carrier aggregation system, in order to reconfigure the aggregated cell when the aggregated cell (carrier) of UE changes within the corresponding carriers of the cell set in which the carriers can be aggregated.

For achieving above purposes, the present invention provides a method for reconfiguring an aggregated cell, comprising:

A network side device judges whether the aggregated cell of a UE needs to be changed in the cell set in which the carriers can be aggregated;

When the judgment result is that the change is needed, the network side device transmits a RRC connection reconfiguration message to the UE, and the RRC connection reconfiguration message carrying the change information of the aggregated cell of the UE;

The UE receives the RRC connection reconfiguration message, and reconfigures the aggregated cell according to the RRC connection reconfiguration message.

The present invention provides a kind of network side device, comprising:

Judging module, is used for judging whether the aggregated cell of a UE needs to be changed in the cell set in which the carriers can be aggregated;

Sending module, is used for transmitting RRC connection reconfiguration message to said UE when the judgment result of the judging module is that the aggregated cell of the UE needs to be changed in the cell set in which the carriers can be aggregated, and said RRC connection reconfiguration message carries the change information of the aggregated cell of the UE; so that the UE reconfigures aggregated cell according to RRC connection reconfiguration message.

The present invention provides a user equipment UE, comprising:

Receiving module, is used for receiving RRC connection reconfiguration message from said network side device when network side device judging that the aggregated cell of the UE needs to be changed in the cell set in which the carriers can be aggregated; and said RRC connection reconfiguration message carries change information of the aggregated cell of the UE.

Processing module is used for reconfiguring aggregated cell according to RRC connection reconfiguration message which is received by the receiving module.

The present invention provides a system for reconfiguring an aggregated cell, comprising:

Network side device, is used for judging whether the aggregated cell of UE needs to be changed in the cell set in which the carriers can be aggregated; when the judgment result is need to change, transmitting RRC connection reconfiguration message to said UE, said RRC connection reconfiguration message carrying the change information of the aggregated cell of said UE.

UE, is used for receiving said RRC connection reconfiguration message, and reconfiguring the aggregated cell according to said RRC connection reconfiguration message.

Comparing with the present technology, embodiments of the invention at least including the following advantages:

For LTE-A system, when the aggregated cell of UE which supports the carrier aggregation changes within the same cell set in which the carriers can be aggregated, the aggregated cell of the UE can be reconfigured by using RRC signalling which doesn't carry handover related information; in addition, the same AS key can also be used to perform the security processing procedure for data, so as to avoid the problem of data transmission interrupt and data loss caused by frequent handover when the aggregated cell (carrier) of UE changes in the same cell set in which the carriers can be aggregated, which enables the uninterrupted transmission for the data.

DETAILED DESCRIPTION OF THE EMBODIMENTS OF THE PRESENT INVENTION

As described in the background technology, for the problem of data transmission interrupt and data loss caused by the recalculation of the AS key during the process of UE performing handover, the present invention provides a method for reconfiguring the aggregated cell when the aggregated cell of UE changes in the cell (carrier) set in which the carriers can be aggregated in carrier aggregation system. It isn't necessary to recalculate AS key by using the method for reconfiguring the aggregated cell, so as to enable the uninterrupted transmission for the data when the aggregated cell of the UE changes in carrier aggregation system. It is necessary to explain that the aggregated cell of the UE in present invention refers to the cells which are aggregated to provide service(s) for UE simultaneously. There are two apprehensions of the cell set in which the carriers can be aggregated: 1, from the network side angle, the cell which can perform carrier aggregation; 2, from the UE capability angle, the cell which can perform carrier aggregation. The second apprehension refers to: if the number of the carriers which can be aggregated of network side is five, the carriers of 1 to 4 belong to one band, the fifth carrier belongs to another band, because UE can only aggregate the carriers in one band, so, from the UE capability angle, the cell (carrier) set in which the carriers can be aggregated is the carriers of 1 to 4.

The method in the present invention satisfies the two apprehensions of the cell set in which the carriers can be aggregated. In addition, as described in the background technology, in carrier aggregation system, each cell comprises at least one (or a pair) carrier which can transmit data independently, so the method for reconfiguring aggregated cell(s) provided by the present invention can also be called method for configuring aggregated carrier(s). Accordingly, the aggregated carrier of UE can be used for describing the aggregated cell of UE, the carrier which can be aggregated can be used for describing the aggregated cell which can be aggregated. Because the process is similar, it will be only described by using the conception of aggregated cell in following embodiment procedures, and the aggregation carrier will not be described repeatedly.

In the following contents, clear and complete descriptions of the technology programs of the present invention are made combined with drawings of the embodiments. It is clear that the embodiments of the present invention described here are only parts of the embodiments of the present invention. According to the embodiments of the present invention, any other embodiments made by technical personnel of the field in the absence of creative work are all belong to the scope of the patent protection of the invention.

Figure 1:
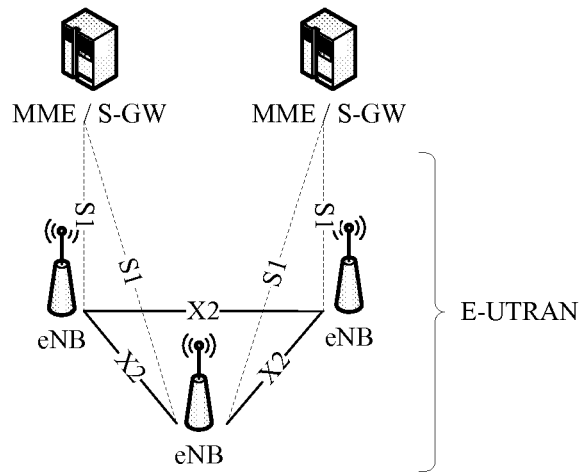
FIG. 1 is a network architecture diagram of LTE system in existing technology.
Figure 2:
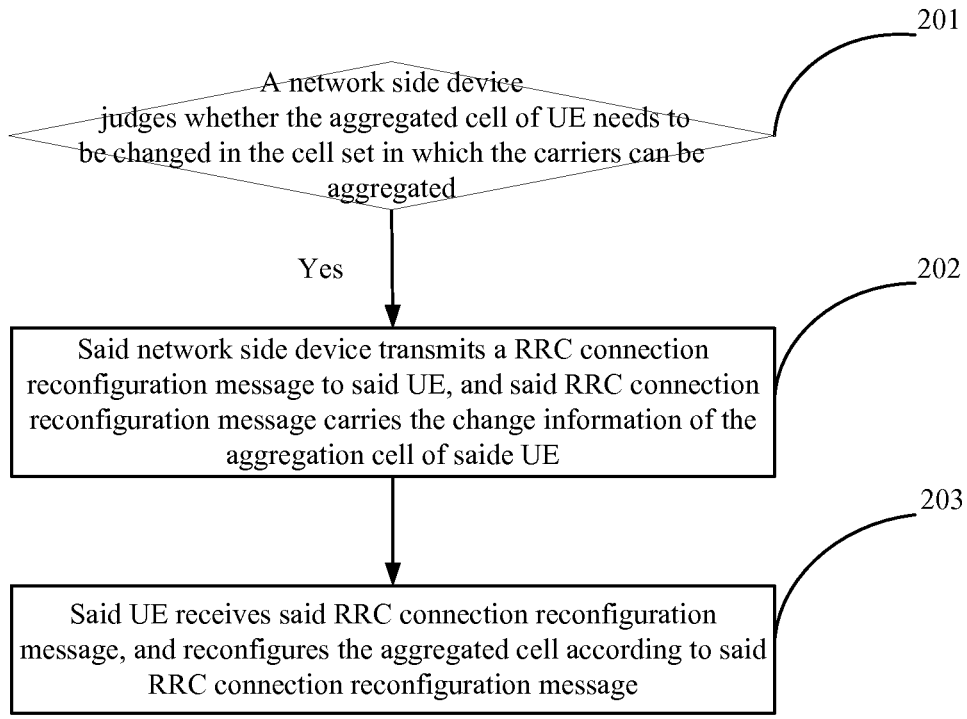
FIG. 2 is a flow diagram of a method for reconfiguring an aggregated cell of Embodiment 1 of the present invention.

As shown in FIG. 2, embodiment 1 of the present invention provides a method for reconfiguring aggregated cell, comprising the following steps:

Step 201, A network side device judges whether the aggregated cell of UE needs to be changed in the cell set in which the carriers can be aggregated.

Specifically, whether said aggregated cell of the UE changes in the cell set in which the carriers can be aggregated, comprising one or several of the following contents: the main serving cell of said UE changing in the cell set in which the carriers can be aggregated; the serving cell of said UE changing in the cell set in which the carriers can be aggregated; the anchor cell of said UE changing in the cell set in which the carriers can be aggregated; all or part of aggregated cells of said UE changing in the cell set in which the carriers can be aggregated. Therein, all or part of aggregated cells of said UE changing in the cell set in which the carriers can be aggregated, comprising one or several of the following contents: Adding new cell(s) to the aggregated cell of said UE; deleting cell(s) from the aggregated cell of said UE; changing configuration information of all or part of cells comprised in the aggregated cell of said UE.

Further, said network side device judges whether the aggregated cell of a UE needs to be changed in the cell set in which the carriers can be aggregated, comprising: said network side device judges whether the aggregated cell of UE needs to be changed in the cell set in which the carriers can be aggregated according to measurement report of the UE; or, said network side device judges whether the aggregated cell of UE needs to be changed in the cell set in which the carriers can be aggregated according to the load of each cell in the cell set in which the carriers can be aggregated; or, said network side device judges whether the aggregated cell of a UE needs to be changed in the cell set in which the carriers can be aggregated according to service requirements of UE.

It is necessary to explain that, when the aggregated cell (carrier) of UE changes in the same cell set in which the carriers can be aggregated, network side device and UE can continue to use security arithmetic and key (AS key) which is used currently for data security processing. When the aggregated cell (carrier) of UE changes in the same cell set in which the carriers can be aggregated, it doesn't need to change the key, so it is not necessary to re-establish PDCP, RLC and other entities, which avoids the interruption time of data transmission caused by changing the key and re-establishing PDCP, RLC and other entities, and also avoids data loss caused by re-establishing above PDCP, RLC entities. For example, when UE supports the aggregation of five cells (carrier), and network side can also aggregate five cells (carrier), but network side only configures three aggregated cells (carrier) for the UE due to service requirement and other factors; if the aggregated cell (carrier) of the UE needs to be changed and the changing range is in the above five cells (carrier), it can use the carrier reconfiguration procedure in which it doesn't need to change key and re-establish PDCP, RLC and other entities, which enables the uninterrupted transmission for the data.

In embodiments of the present invention, when there are multiple serving cells in the aggregated cell of UE, there will be main serving cell for the serving cells. The serving cell may has one or several of the following characters: 1, monitoring system information; 2, monitoring Paging; 3, using for KeNB* calculation; 4, measuring reference cell; 5, configuration reference cell with Delta signalling; 6, providing NAS mobility parameters (PLMN ID, TAC, ECGI); 7, wireless link failure reference cell and so on.

When main serving cell exists, main serving cell may have all or part of characters of the above serving cell. When main serving cell has characters of the above serving cell, the common serving cell doesn't need to have the corresponding characters. When there is only one serving cell in the aggregated cells of UE, the serving cell may have part or all characters of the above serving cell. The AS key can be calculated by using the PCI and downlink carrier frequency of main serving cell when handover occurs.

Further, when the carrier are aggregated, there are many repeated contents in system messages which need to be broadcasted in each carrier. It may introduce the conception of anchor component carrier to solve the problem of repeated contents in system messages. The anchor component carrier refers to reference carrier when configuring system message broadcasting; when other carrier transmits system information, it needs to refer to the system message configuration of the anchor component carrier; the content which is same as the system message of the anchor component carrier can only be given with some indications and doesn't need to be transmitted repeatedly, which will not be described with unnecessary details again in the present invention.

Figure 3:
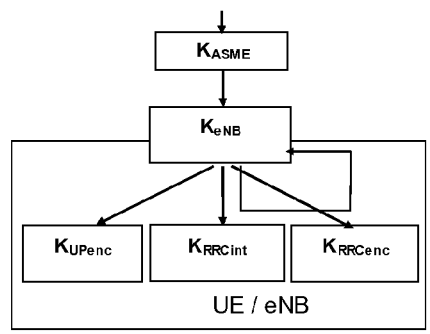
FIG. 3 is a relationship diagram between keys of the present invention.

Specifically, as shown in FIG. 3, it is a relationship diagram among keys. It is observed that, the above AS key comprises: encryption key of RRC signalling (denoted by KRRCenc in embodiments of the present invention), encryption key of user data (denoted by KUPenc in embodiments of the present invention) and integrality protection key of RRC signalling (denoted by KRRCint in embodiments of the present invention) and so on. Therein, all the above three AS keys are deduced through Key Deducing Function (KDF) by KeNB key. The KeNB key is the KeNB which generated based on KASME by UE and network side device when UE enters into ECM-CONNECTED state, and the KASME is obtained by high-level process. Because the embodiment of the present invention is regard to the above 3 AS keys, the processing procedure of KASME and KeNB would not be described with unnecessary details again. It is observed that, when KeNB changes, three security keys of AS will be deduced again and changed. For the existing handover procedure, a target cell and UE need to obtain a new KeNB, and calculate new KRRCenc, KUPenc and KRRCint according to the new KeNB, so that normal encryption protection and integrality protection can be continued after the UE accesses to target cell. PCI and downlink carrier frequency of target cell are two input parameters needed for calculating KeNB* (in addition, other input parameters needed for calculating KeNB* would not be described with unnecessary details again in the present invention); target cell and UE can obtain KeNB according to the KeNB* which obtained by computing, and computing KRRCenc, KUPenc and KRRCint according to new KeNB for communication security protection.

Step 202, When the judgment result is that the change is needed, said network side device transmits a RRC connection reconfiguration message to said UE, and said RRC connection reconfiguration message carries the change information of the aggregated cell of said UE. Therein, the change information of the aggregated cell of said UE, comprises one or several of the following contents: the corresponding frequency information or frequency information index of the changed aggregated cell; the corresponding carrier configuration information of the changed aggregated cell; the corresponding frequency configuration information of the changed aggregated cell; the corresponding system information of the changed aggregated cell; the corresponding component carrier identifier of the changed aggregated cell; the corresponding cell identifier of the changed aggregated cell; identifier information of serving cell and/or main serving cell of the changed aggregated cell. It is necessary to explain that the corresponding cell identifier of the changed aggregated cell can be: the corresponding physical layer cell ID of the aggregated cell; and/or, the corresponding E-UTRAN Cell Global ID (ECGI) of the aggregated cell; and/or the corresponding cell ID of the aggregated cell. ECGI can uniquely identify one cell in global range, and the local cell ID can only uniquely identify one cell in one PLMN (Public Land Mobile-communication Network).

Further, the change information of the aggregated cell of said UE, further comprises: the corresponding MAC layer reconfiguration information and/or physical layer reconfiguration information of the changed aggregated cell, which also can be called as the corresponding carrier configuration information of the aggregated cell.

But when the change information of the aggregated cell of said UE carries the corresponding MAC layer reconfiguration information and/or physical layer reconfiguration information of the changed cell, after UE received said RRC connection reconfiguration message, said UE reconfigures MAC layer entity and/or physical layer entity, according to the MAC layer reconfiguration information and/or physical layer reconfiguration information in the RRC connection reconfiguration information.

Further, said network side device transmitting RRC connection reconfiguration information to the UE, further comprises: said network side device transmitting RRC connection reconfiguration message, which carries change information of the aggregated cell of UE instead of mobility control information and security configuration information, to UE. And when the network side device transmits RRC connection reconfiguration message, which carries change information of the aggregated cell of UE instead of mobility control information and security configuration information, to UE, said UE uses the AS key which is used before receiving the RRC connection configuration message for security handling, and transmits reconfiguration complete message to said network side device, to enables the uninterrupted transmission for the data.

Specifically, said UE using the AS key which is used before receiving said RRC connection configuration message for security handling, comprises one or several of the following contents: said UE using KUPenc key in AS key which is used before receiving said RRC connection configuration message for data encryption and decryption; said UE using KRRCint key in AS key which is used before receiving said RRC connection configuration message for RRC signalling integrity protection and verification; said UE using KRRCenc key in AS key which is used before receiving said RRC connection configuration message for RRC signalling encryption and decryption.

Step 203, Said UE receives said RRC connection reconfiguration message, and reconfigures the aggregated cell according to said RRC connection reconfiguration message.

In embodiments of the present invention, after reconfiguring the aggregated cell according to said RRC connection reconfiguration message, further comprising: said UE judging whether to perform random access procedure; when the judgment result is positive, performing random access procedure; when the judgment result is negative, omitting random access procedure.

It is necessary to explain that, for the random access procedure of the UE, whether the UE needs to perform random access procedure can also be obtained by the network said device, and transmit the obtained result to the UE. At the moment, before the network side device transmits said RRC connection reconfiguration message to said UE, said network side device judges whether said UE needs to perform random access procedure, and transmits RRC connection reconfiguration message, which carries random access instruction information to said UE. Said random access instruction information is used for indicating UE whether to perform random access procedure. Further, when the judgment result is positive, said network side device assigns preamble which is used for performing random access procedure by said UE, and transmitting the identifier information of preamble to said UE via carrying the identifier information in the RRC connection reconfiguration messages. From the UE side, said UE judging whether to perform random access procedure, further comprises: the UE judging whether to start random access procedure, according to RRC connection reconfiguration message carrying random access instruction information or not.

Further, reconfiguring aggregated cell according to said RRC connection reconfiguration message, comprises one or several of the following contents: said UE configuring the corresponding MAC layer entity and/or physical layer entity for the new added aggregated cell; said UE deleting or reconfiguring the corresponding MAC layer entity and/or physical layer entity for the cell which is deleted from original aggregated cell; said UE reconfiguring the corresponding MAC layer entity and/or physical layer entity for the cell which is still used in original aggregated cell.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can also be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 4:
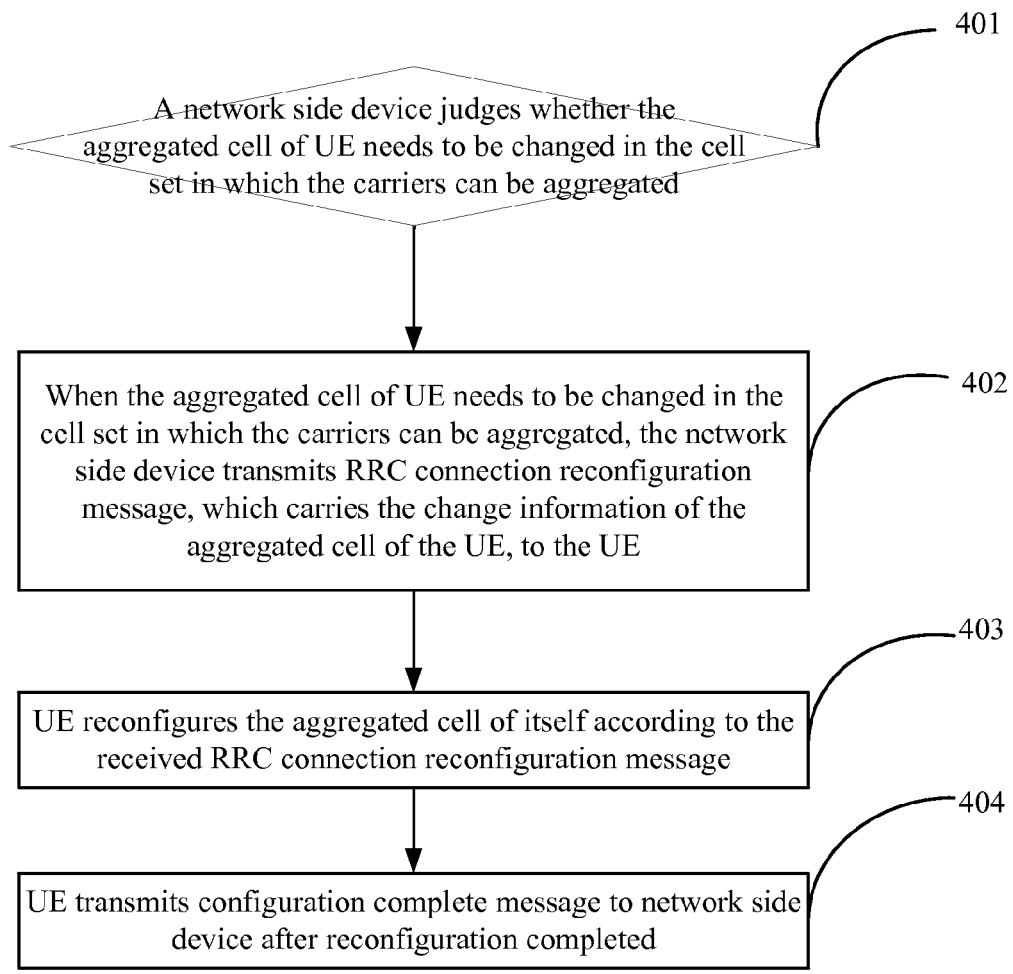
FIG. 4 is a flow diagram of a method for reconfiguring an aggregated cell of Embodiment 2 of the present invention.
Figure 5:
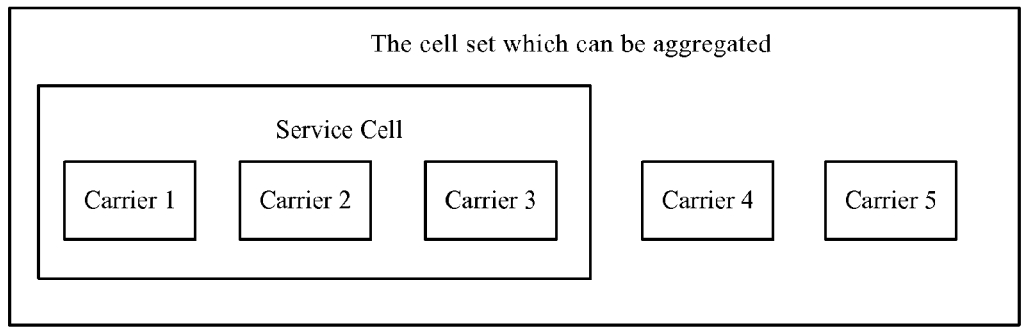
FIG. 5 is a diagram of the cell set in which the carriers can be aggregated used by the present invention.

As shown in FIG. 4, embodiment 2 of the present invention provides a method for reconfiguring aggregated cell in carrier aggregation system. In this embodiment, the reason of reconfiguring aggregated cell is whether the aggregated cell of UE changes in the cell set in which the carriers can be aggregated. As shown in FIG. 5, carrier 1, carrier 2, carrier 3, carrier 4 and carrier 5 compose aggregation carrier, therein, carrier and cell are corresponding, it can be called that cell 1, cell 2, cell 3, cell 4 and cell 5 compose aggregated cell (supposing that carrier index is the same as corresponding cell index); taking cell 1, cell 2 and cell 3 being the cells providing service for UE currently for example to explain. It is necessary to explain that, the cell set in which the carriers can be aggregated in embodiments of the present invention, for the network side, is the cell set in which the carriers can be aggregated together by the network side to provide carrier aggregation transmission for UE; for UE side, is the cell set in which the carriers can be aggregated together by the UE to perform carrier aggregation transmission. For example, as shown in FIG. 5, the number of the cells which the network side can aggregate for the UE is five (cell 1, cell 2, cell 3, cell 4 and cell 5); but the number of the cells which the UE can aggregate together for carrier aggregation transmission is three (choosing cell 1, cell 2 and cell 3); besides, in embodiments of the present invention, the aggregated cell of LTE-A UE is configured by the network side, the cell in which the UE can perform carrier aggregation transmission, can comprise only one cell (for example, when LTE-A UE just accesses to network, there may be only one cell, then the cell is also called the aggregated cell of UE); but also can comprises several cells, which is not described with unnecessary detail in the present invention.

Specifically, the method for reconfiguring the aggregated cell, comprises the following steps:

Step 401, A network side device judges whether the aggregated cell of UE needs to be changed in the cell set in which the carriers can be aggregated. Therein, the way of the network side device judging whether the aggregated cell of UE needs to be changed in the cell set in which the carriers can be aggregated, comprising: the network side device judging whether the aggregated cell of a UE needs to be changed in the cell set in which the carriers can be aggregated according to measurement report of the UE. For example, when measurement report of the UE indicates that the signal quality of certain cell is better than that of current serving cell, it determines that the serving cell of UE needs to be changed. Giving an example for explaining: when measurement report of the UE indicates that the signal quality of cell A is better than the signal quality of current serving cell B, if satisfying the setting condition (for example: when the signal quality of cell A is better than the signal quality of current serving cell B and exceeds the setting threshold), it determines that the serving cell of UE should be changed to cell A. Or, network side device judges whether the aggregated cell of UE needs to be changed in the cell set in which the carriers can be aggregated, according to the load of each cell in the cell set in which the carriers can be aggregated. For example, when the network side device discovers that there is few UE in a certain cell, but there is many UEs in the cell which providing service for UE1 at the same time, the network side device can change the serving cell of UE1 from the cell with many UEs to the cell with few UE. Giving an example for explaining: when network side device discovers that cell 1 (current serving cell of UE1) provides service for one hundred UEs at the same time, but cell 2 provides service for ten UEs, the network side device can inform UE1 to set cell 2 as its serving cell, which will not be described with unnecessary detail in the present invention. Or, network side judges whether the aggregated cell of a UE needs to be changed in the cell set in which the carriers can be aggregated according to service requirements of UE. For example: UE2 uses two aggregated cells for receiving and transmitting of two services in beginning, then UE2 added a kind of new service for receiving and transmitting, network side judges that it is necessary to add a new aggregated cell for UE. Giving an example for explaining: UE2 using cell 1 and cell 2 for data receiving and transmitting in beginning, when the service requirements rises, network side judging that the cell 3 should be added to the serving cell of UE2 for data receiving and transmitting, the network side inform the aggregated cell information and other related configuration information of cell 3 to UE, which will not be described with unnecessary detail in the present invention. In the embodiments of the present invention, the network side device include but not limited to radio network controller (RNC), node B (NB), eNB, relay, base station and so on. It is necessary to explain that, the network side device is not limited to the above device, and all the devices which locate in the network side and can transmit RRC connection configuration message to UE are all belong to the scope of the patent protection of the invention.

Step 402, When the aggregated cell of UE needs to be changed in the cell set in which the carriers can be aggregated, the network side device transmits RRC connection reconfiguration message, which carries the change information of the aggregated cell of the UE, to the UE.

It is necessary to explain that, in the embodiment of the present invention, the RRC connection reconfiguration message may carry related information for indicating handover, but also may not carry related information for indicating handover. Further, when RRC connection reconfiguration message carries related information for indicating handover, UE needs to perform corresponding handover procedure; but when RRC connection reconfiguration message does not carry related information for indicating handover, UE does not need to perform corresponding handover procedure. It is obvious that, in the embodiment of the present invention, it can enable the uninterrupted transmission for the data through setting the RRC connection reconfiguration message not to carry related information for indicating handover (that is not to perform the handover procedure). In addition, in embodiment of the present invention, related information for indicating handover comprising mobility control information and security configuration information; other information which is carried in the RRC connection reconfiguration message comprising wireless source configuration information (such as physical layer configuration information, MAC configuration information and so on), measurement configuration information and so on; and the change information of the aggregated cell of UE which is carried in the above information (i.e. RRC connection reconfiguration message) comprises but not limited to: the corresponding frequency information or frequency information index of the changed aggregated cell; the corresponding carrier configuration information of the changed aggregated cell; the corresponding frequency configuration information of the changed aggregated cell (such as the corresponding bandwidth information of the frequency and so on); the corresponding system information of the changed aggregated cell; the corresponding component carrier identifier of the changed aggregated cell; the corresponding cell identifier of the changed aggregated cell; identifier information of the changed serving cell and/or main serving cell. It is necessary to explain that, the corresponding cell identifier of the changed aggregated cell can be: the corresponding physical layer cell ID of the aggregated cell; and/or, the corresponding E-UTRAN cell global ID of the aggregated cell; and/or, the corresponding cell ID of the aggregated cell. Further, the change information of the aggregated cell of the UE, further comprises: the corresponding MAC layer reconfiguration information and/or physical layer reconfiguration information of the changed aggregated cell. When the RRC connection reconfiguration message carries the corresponding MAC layer reconfiguration information and/or physical layer reconfiguration information of the changed aggregated cell, UE needs to reconfigure MAC layer entity and/or physical layer entity according to the MAC layer reconfiguration information and/or physical layer reconfiguration information in said RRC connection reconfiguration information.

Step 403, UE reconfigures the aggregated cell of itself according to the received RRC connection reconfiguration message. Therein, when the RRC connection reconfiguration message carries related information for indicating handover, the UE configures the related configuration information for handover; but when RRC connection reconfiguration message does not carry related information for indicating handover, the UE does not need to switch, and UE would not update KeNB, and also does not need to recalculate KRRCenc, KUPenc and KRRCint, so as to enable the uninterrupted transmission for the data. In the embodiment of the present invention, UE reconfiguring the aggregated cell of itself according to RRC connection reconfiguration message comprises: UE reconfiguring according to the change information of the aggregated cell of UE which is carried in RRC connection reconfiguration message, which will not be described with unnecessary details again in the present invention.

Step 404, UE transmits configuration complete message to network side device after reconfiguration completed. Therein, when RRC connection reconfiguration message does not carry related information for indicating handover, the UE transmits configuration complete message to network side device by using existing AS key. For example, when UE discovers that (main) serving cell of itself has changed from cell 1 to cell 2 (obtained from RRC connection reconfiguration message), UE transmits configuration complete message to network side device by using existing AS key based on cell 1, and does not need to recalculate AS key by using PCI and/or downlink carrier frequency of cell 2, so that it is not necessary to re-establish PDCP, RLC and other entities, which enables the uninterrupted transmission for the data. That is to say that it enables the uninterrupted transmission for the data when (main) serving cell changes and the changed (main) serving cell still locates in current aggregated cell (carrier).

It is necessary to explain that, in the embodiment of the present invention, the conception of aggregated cell is the same as that of aggregation carrier, and the reason is that some enterprises describes the conception by using the conception of aggregation carrier and others describes conception by using the conception of aggregated cell, which will not be described with unnecessary details again in the present invention.

Further, it is necessary to explain that, in the embodiment of the present invention, it is necessary to judge whether to start random access procedure according to actual needs between steps 403 and step 404. For example, when the aggregated cell of UE changes in the cell set in which the carriers can be aggregated, and it is not necessary to perform random access procedure according to the judgment of channel condition or the agreement of standard, then the random access procedure is not needed. When the aggregated cell of UE changes in the cell set in which the carriers can be aggregated, and it is necessary to perform random access procedure according to the judgment of channel condition or the agreement of standard, then the random access procedure is needed.

In addition, for the random access procedure of the UE, network side device also can obtain whether UE needs to perform random access procedure, and sends the result to the UE. At the moment, the network side device should judge whether the UE needs to perform random access procedure, and transmits RRC connection reconfiguration message, which carries random access instruction information, to the UE; and the random access instruction information is used for indicating whether UE needs to perform random access procedure. Further, when the judgment result is positive, the network side device assigns preamble which is used for performing random access procedure, and transmits the identifier information of preamble to said UE via carrying the identifier information in the RRC connection reconfiguration messages. In UE side, the UE judges whether to start random access procedure, according to RRC connection reconfiguration message carrying random access instruction information or not.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can also be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 6:
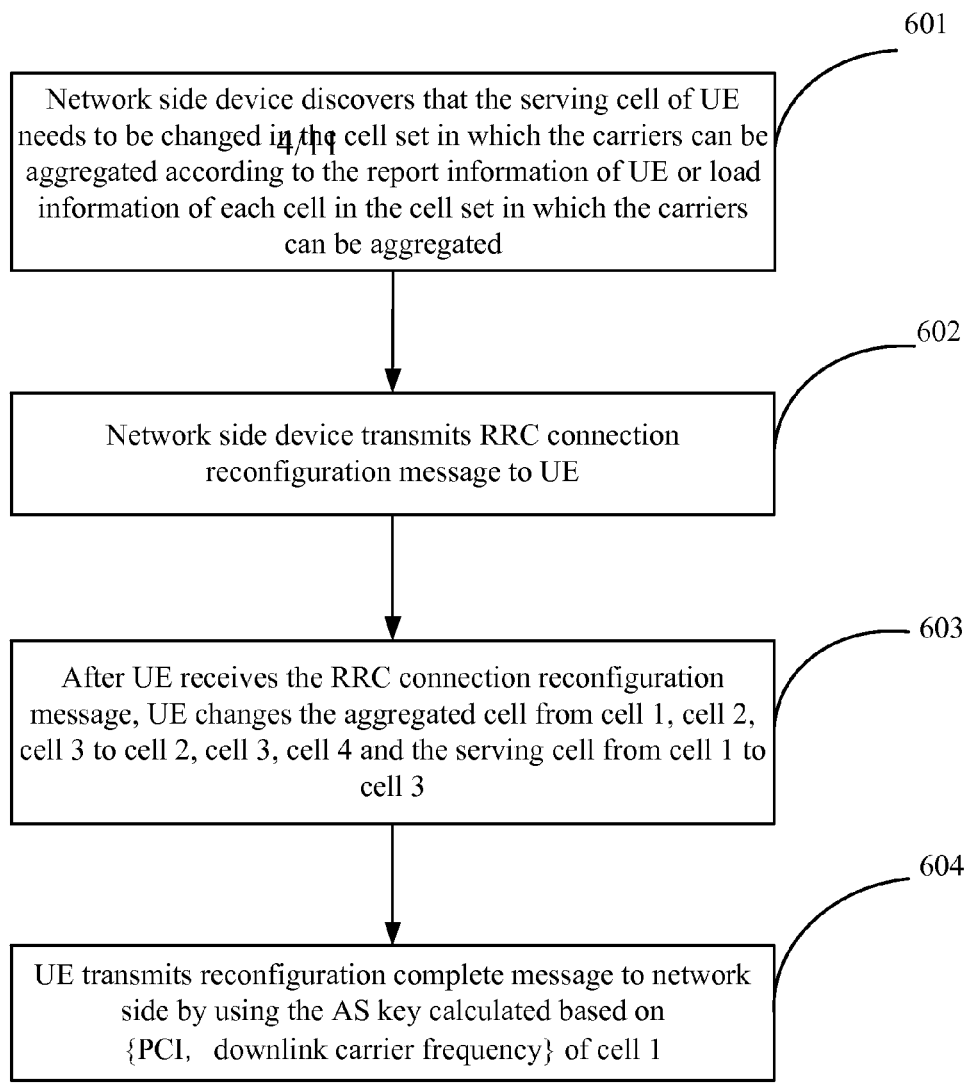
FIG. 6 is a flow diagram of a method for reconfiguring an aggregated cell of Embodiment 3 of the present invention.

As shown in FIG. 6, embodiment 3 of the present invention provides a method for reconfiguring an aggregated cell in carrier aggregation system. In this embodiment, it takes the serving cell changing in the cell set in which the carriers can be aggregated and not performing handover procedure for example to explain, as shown in FIG. 5, the cells in the cell set in which the carriers can be aggregated of current network side device comprise cell 1, cell 2, cell 3, cell 4 and cell 5, and the current cells which the UE can aggregate together for carrier aggregation transmission are cell 1, cell 2 and cell 3 (supposing that carrier index is the same as corresponding cell index) and the serving cell is cell 1. The current security key (AS key) is calculated based on the {PCI, downlink carrier frequency} of cell 1. The method for reconfiguring an aggregated cell, comprises the following steps:

Step 601, Network side device discovers that the serving cell of UE needs to be changed in the cell set in which the carriers can be aggregated according to the report information of UE (network side judging the aggregation of UE needs to be changed in the cell set in which the carriers can be aggregated) or load information of each cell in the cell set in which the carriers can be aggregated (network side judging the aggregation of UE needs to be changed in the cell set in which the carriers can be aggregated). Therein, in the embodiment of the present invention, it take changing the aggregated cell of UE from cell 1, cell 2, cell 3 to cell 2, cell 3, cell 4 and the serving cell from cell 1 to cell 3 for example to explain.

Step 602, Network side device transmits RRC connection reconfiguration message to UE. Therein, the contents carried in RRC connection reconfiguration messages comprises but not limited to: (1) the frequency information (or frequency index) and/or frequency configuration information (such as: the corresponding bandwidth of the frequency) of cell 2, cell 3, cell 4; (2) the corresponding reconfiguration information (or can also be called configuration update information) of MAC layer and/or physical layer entity of the cell 2, cell 3, cell 4; (3) the indication information of serving cell, which is used to notify cell 3 as the serving cell of UE (the notification procedure can be implemented by setting serving cell indication bit, for example, when serving cell indication bit of configuration aggregation information for a certain cell is 1, this cell is set to serving cell, otherwise the corresponding cell is not serving cell); (4) the related system information of cell 2, 3, 4; in addition, it also comprises the configuration parameters which will not trigger re-establishment of PDCP or RLC entity, such as: configuration value of timer; (5) the corresponding component carrier identifier of the changed aggregated cell; (6) the corresponding cell identifier of the changed aggregated cell. It is necessary to explain that, the corresponding cell identifier of the changed aggregated cell can be: the corresponding physical layer cell ID of the aggregated cell; and/or, the corresponding E-UTRAN cell global ID of the aggregated cell; and/or, the corresponding cell ID of the aggregated cell; (7) the corresponding carrier configuration information of the changed aggregated cell.

It is necessary to explain that, indication information of (main) serving cell (or can be called identifier information of (main) serving cell) can use the form of setting the above serving cell indication bit, and also can use other forms. For example, judging which cell is (main) serving cell according to the serving cells carrying some configuration information which other serving cells do not carry.

Step 603, After UE receives the RRC connection reconfiguration message, UE changes the aggregated cell from cell 1, cell 2, cell 3 to cell 2, cell 3, cell 4 and the serving cell from cell 1 to cell 3; and configures or updates the corresponding MAC layer and/or physical layer entity of each cell; and configures according to related system information of each cell. In addition, if RRC connection reconfiguration message comprises reconfiguration parameters of PDCP and/or RLC entity, then it is necessary to configure the corresponding parameters of PDCP and/or RLC according to the indication, which will not be described with unnecessary details again in the present invention. Because taking the information which not be used for indicating handover for example to explain in the embodiment of the present invention, it is not necessary to recalculate the information of AS key and re-establish PDCP, RLC entity in this step.

Step 604, UE transmits reconfiguration complete message to network side by using the AS key calculated based on {PCI, downlink carrier frequency} of cell 1.

It is necessary to explain that, in the embodiment of the present invention, when it is not necessary to reconfigure related entity (MAC layer and/or physical entity) of cell 2, cell 3, the RRC connection reconfiguration message can only carry entity reconfiguration information of MAC layer and/or physical layer entity of cell 1 instead of comprising related entity reconfiguration information of cell 2, cell 3. Similarly, when it is not necessary to carry system information and other information of cell 2, cell 3, it is also not necessary to carry system information and other information of cell 2, cell 3 in the RRC connection reconfiguration message, which will not be described with unnecessary details again in the present invention.

In addition, the frequency information of cell 2, cell 3, cell 4 also can be indicated in the form of the bitmap when UE has known the specific frequency. For example, if the cell set in which the carriers can be aggregated comprises five aggregated cells, and UE has known the corresponding frequency information of the aggregated cell: the frequency information of cell 1 is 850 MHz, cell 2 is 900 MHz, cell 3 is 900 MHz, cell 4 is 950 MHz, cell 5 is 1000 MHz, the network side device transmits the bitmap 01110 to UE, then UE can know the aggregated cells are cell 2, cell 3, cell 4, and the corresponding frequency is: 900 MHz, 900 MHz and 950 MHz respectively. In addition, if the corresponding frequency configuration information of the frequency is also binded with cell and UE has known that, then frequency configuration information may not be transmitted, after knowing aggregated cell UE may know frequency information of the corresponding cell, which will not be described with unnecessary details again in the present invention.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can also be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 7:
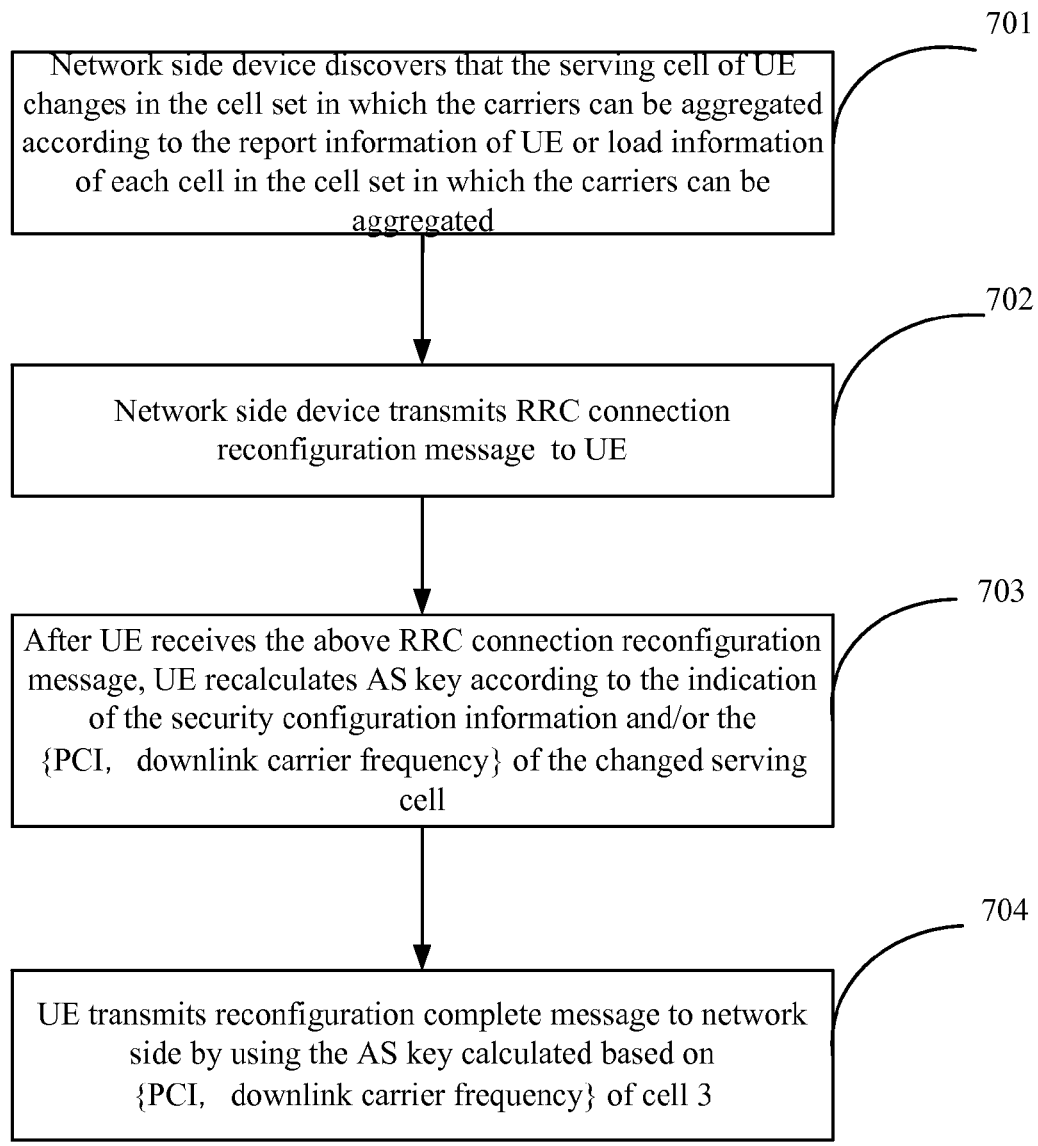
FIG. 7 is a flow diagram of a method for reconfiguring an aggregated cell of Embodiment 4 of the present invention.

As shown in FIG. 7, embodiment 4 of the present invention provides a method for reconfiguring aggregated cell. In this embodiment, it takes the serving cell changing in the cell set in which the carriers can be aggregated and performing handover procedure for example to explain. It is obvious that, different from embodiment 3, when serving cell changes in the cell set in which the carriers can be aggregated, and it is necessary to perform handover procedure in embodiment of the present invention. As shown in FIG. 5, the cells in the cell set in which the carriers can be aggregated of current network side device comprise cell 1, cell 2, cell 3, cell 4 and cell 5, and the cells which the current UE can aggregate together for carrier aggregation transmission are cell 1, cell 2 and cell 3 and the serving cell is cell 1. The current AS key is calculated based on the {PCI, downlink carrier frequency} of cell 1. The method for reconfiguring an aggregated cell, comprises the following steps:

Step 701, Network side device discovers that the serving cell of UE changes in the cell set in which the carriers can be aggregated according to the report information of UE or load information of each cell in the cell set in which the carriers can be aggregated. Therein, in the embodiment of the present invention, it takes changing the aggregated cell of UE from cell 1, cell 2, cell 3 to cell 2, cell 3, cell 4 and the serving cell from cell 1 to cell 3 for example to explain.

Step 702, Network side device transmits RRC connection reconfiguration message (which can also be called as handover command in this embodiment) to UE. Therein, the contents carried in RRC connection reconfiguration messages comprise but not limited to: handover indication information (such as mobility control information, security configuration information and so on); the frequency information (or frequency index) and/or frequency configuration information of cell 2, cell 3, cell 4; the indication information of serving cell; the related system information of cell 2, 3, 4; the corresponding reconfiguration information of MAC layer and/or physical layer entity of the cell 2, cell 3, cell 4; the re-establishment parameters when PDCP and RLC entity re-establishes; the corresponding component carrier identifier of the changed aggregated cell; the corresponding cell identifier of the changed aggregated cell. It is necessary to explain that, the corresponding cell identifier of the changed aggregated cell can be: the corresponding physical layer cell ID of the aggregated cell; and/or, the corresponding E-UTRAN cell global ID of the aggregated cell; and/or, the corresponding cell ID of the aggregated cell.

Step 703, After UE receives the above RRC connection reconfiguration message, UE recalculates AS key according to the indication of the security configuration information and/or the {PCI, downlink carrier frequency} of the changed serving cell, and changes the aggregated cells from cell 1, cell 2, cell 3 to cell 2, cell 3, cell 4 and the serving cell from cell 1 to cell 3; and configures or updates the corresponding MAC layer and/or physical layer entity of each cell; and performs the corresponding configuration according to the related system information of each cell. In the embodiment of the present invention, because it is necessary to update the AS key, it is also necessary to re-establish the corresponding PDCP entity, RLC entity etc. Therein, recalculating AS key is that recalculating the AS key according to {PCI, downlink carrier frequency} of cell 3, of which the procedure will not be described with unnecessary details again in the present invention.

Step 704, UE transmits reconfiguration complete message (which is also called as handover complete message) to network side by using the AS key calculated based on {PCI, downlink carrier frequency} of cell 3.

It is necessary to explain that, in the embodiment of the present invention, when it is not necessary to reconfigure related entity (MAC layer and/or physical entity) of cell 2, cell 3, the RRC connection reconfiguration message can only carry entity reconfiguration information of MAC layer and/or physical layer entity of cell 1 instead of comprising related entity reconfiguration information of cell 2, cell 3. Similarly, when it is not necessary to carry system information and other information of cell 2, cell 3, it is also not necessary to carry system information and other information of cell 2, cell 3 in the RRC connection reconfiguration message, which will not be described with unnecessary details again in the present invention.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 8:
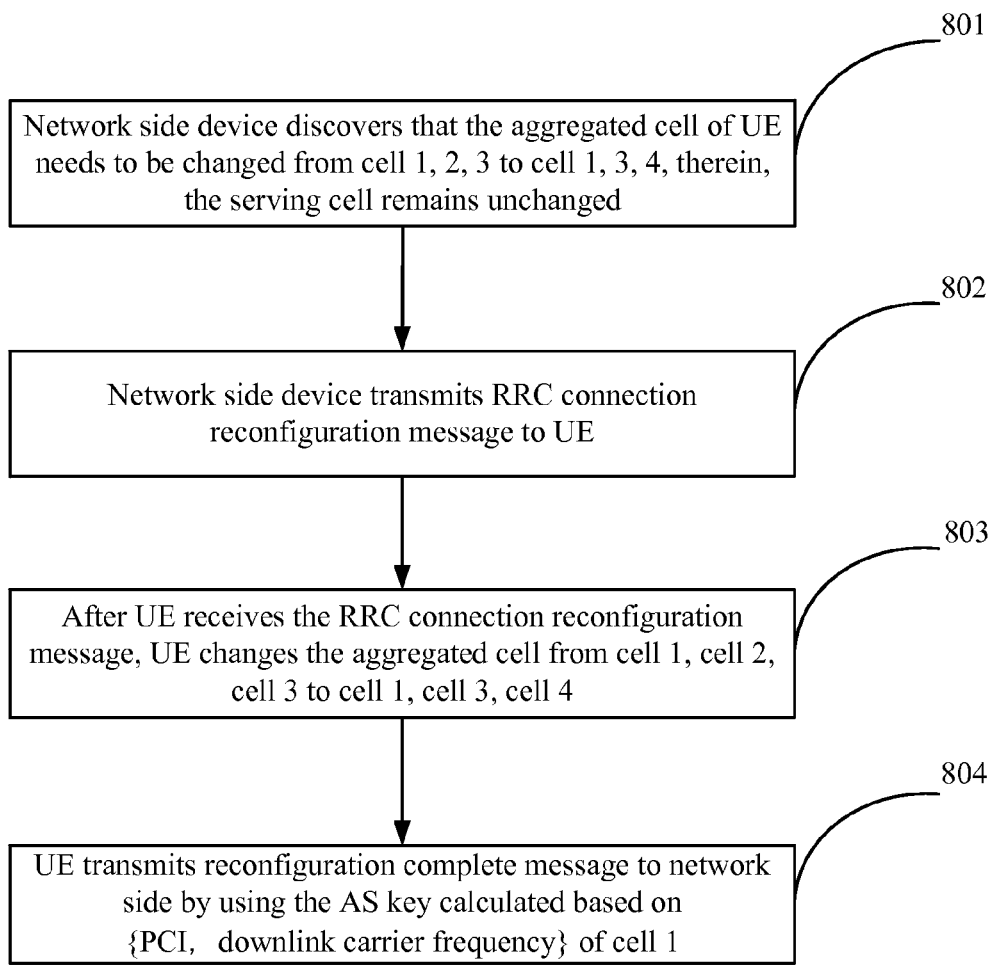
FIG. 8 is a flow diagram of a method for reconfiguring an aggregated cell of Embodiment 5 of the present invention.

As shown in FIG. 8, embodiment 5 of the present invention provides a method for reconfiguring an aggregated cell. In the embodiment of the present invention, it takes the cells change for cells which can be aggregated and are not the serving cell as example to explain, and does not perform handover procedure. As shown in FIG. 5, the cells in the cell set in which the carriers can be aggregated of current network side device comprise cell 1, cell 2, cell 3, cell 4 and cell 5, and the cells which the current UE can aggregate together for carrier aggregation transmission are cell 1, cell 2 and cell 3 and the serving cell is cell 1. The current AS key is calculated based on the {PCI, downlink carrier frequency} of cell 1. The method for reconfiguring an aggregated cell, comprises the following steps:

Step 801, Network side device discovers that the aggregated cell of UE needs to be changed from cell 1, 2, 3 to cell 1, 3, 4, therein, the serving cell remains unchanged.

Step 802, Network side device transmits RRC connection reconfiguration message to UE. Therein, the contents carried in RRC connection reconfiguration messages is comprising but not limited to: the frequency information (or frequency index) and/or frequency configuration information of cell 1, cell 3, cell 4; carrier configuration information of cell 1, cell 3, cell 4; the corresponding reconfiguration information of MAC layer and/or physical layer entity of the cell 1, cell 3, cell 4; the indication information of serving cell; the related system information of cell 1, cell 3, cell 4; in addition, it also comprising the configuration parameters which will not trigger re-establishment of PDCP or RLC entity; the corresponding component carrier identifier of the changed aggregated cell; the corresponding cell identifier of the changed aggregated cell. It is necessary to explain that, the corresponding cell identifier of the changed aggregated cell can be: the corresponding physical layer cell ID of the aggregated cell; and/or, the corresponding E-UTRAN cell global ID of the aggregated cell; and/or, the corresponding cell ID of the aggregated cell.

Step 803, After UE receives the RRC connection reconfiguration message, UE changes the aggregated cell from cell 1, cell 2, cell 3 to cell 1, cell 3, cell 4; and configures or updates the corresponding MAC layer and/or physical layer entity of each cell; and configures according to related system information of each cell. In addition, if RRC connection reconfiguration message comprises reconfiguration parameters of PDCP and/or RLC entity, then it is necessary to configure the corresponding parameters of PDCP and/or RLC according to the indication.

Step 804, UE transmits reconfiguration complete message to network side by using the AS key calculated based on {PCI, downlink carrier frequency} of cell 1.

It is necessary to explain that, in the embodiment of the present invention, when it is not necessary to reconfigure related entity (MAC layer and/or physical entity) of cell 1, cell 3, the RRC connection reconfiguration message can only carry entity reconfiguration information of MAC layer and/or physical layer entity of cell 2 instead of comprising related entity reconfiguration information of cell 1 and cell 3. Similarly, when it is not necessary to carry system information and other information of cell 1, cell 3, it is also not necessary to carry system information and other information of cell 1, cell 3 in the RRC connection reconfiguration message, which will not be described with unnecessary details again in the present invention.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can also be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 9:
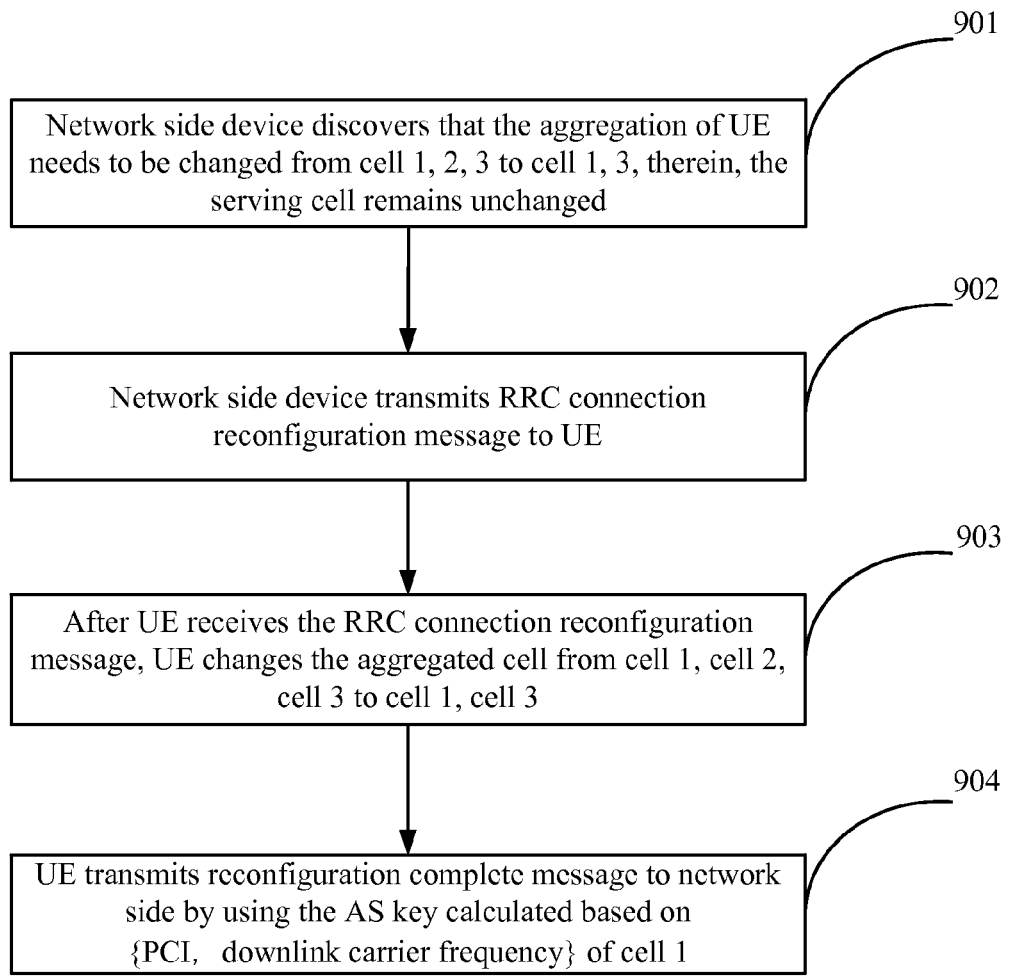
FIG. 9 is a flow diagram of a method for reconfiguring an aggregated cell of Embodiment 6 of the present invention.

As shown in FIG. 9, embodiment 6 of the present invention provides a method for reconfiguring an aggregated cell. In the embodiment of the present invention, it takes the aggregated cell changes of UE within the aggregated cell and does not perform handover procedure as example to explain. Therein, the aggregated cell of UE changing in the changed aggregated cell, comprising but not limited to: (1) UE changing serving cell; (2) deleting or reconfiguring certain aggregated cells; (3) deleting or reconfiguring certain aggregated cells when serving cell changing at the same time, and so on. As shown in FIG. 5, the cells in the cell set in which the carriers can be aggregated of current network side device comprise cell 1, cell 2, cell 3, cell 4 and cell 5, and the cells which the current UE can aggregate together for carrier aggregation transmission are cell 1, cell 2 and cell 3 and the serving cell is cell 1. The current AS key is calculated based on the {PCI, downlink carrier frequency} of cell 1. The method for reconfiguring an aggregated cell, comprises the following steps:

Step 901, Network side device discovers that the aggregation of UE needs to be changed from cell 1, 2, 3 to cell 1, 3, therein, the serving cell remains unchanged.

Step 902, Network side device transmits RRC connection reconfiguration message to UE. Therein, the contents carried in RRC connection reconfiguration messages comprise but not limited to: the frequency information (or frequency index) and/or frequency configuration information of cell 1, cell 3; the corresponding reconfiguration information of MAC layer and/or physical layer entity of the cell 1, cell 3; the indication information of serving cell; the related system information of cell 1, cell 3; further comprising the configuration parameters which will not trigger re-establishment of PDCP or RLC entity; the corresponding component carrier identifier of the changed aggregated cell; the corresponding cell identifier of the changed aggregated cell. It is necessary to explain that, the corresponding cell identifier of the changed aggregated cell can be: the corresponding physical layer cell ID of the aggregated cell; and/or, the corresponding E-UTRAN cell global ID of the aggregated cell; and/or, the corresponding cell ID of the aggregated cell.

Step 903, After UE receives the RRC connection reconfiguration message, UE changes the aggregated cell from cell 1, cell 2, cell 3 to cell 1, cell 3.

Step 904, UE transmits reconfiguration complete message to network side by using the AS key calculated based on {PCI, downlink carrier frequency} of cell 1.

It is necessary to explain that, in the embodiment of the present invention, when it is not necessary to reconfigure related entity (MAC layer and/or physical entity) of cell 1, cell 3, the RRC connection reconfiguration message may not carry entity reconfiguration information cell 1 and cell 3. Similarly, when it is not necessary to carry system information and other information of cell 1 and cell 3, it is also not necessary to carry system information and other information of cell 1 and cell 3 in the RRC connection reconfiguration message, which will not be described with unnecessary details again in the present invention.

It is obvious that, by using the method provided by the present invention, for LTE-A system, when the aggregated cell(s) of the UE which supports the carrier aggregation changes in the same cell set in which the carriers can be aggregated, the aggregated cell of the UE can be reconfigured; and the same AS key can be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Figure 10:
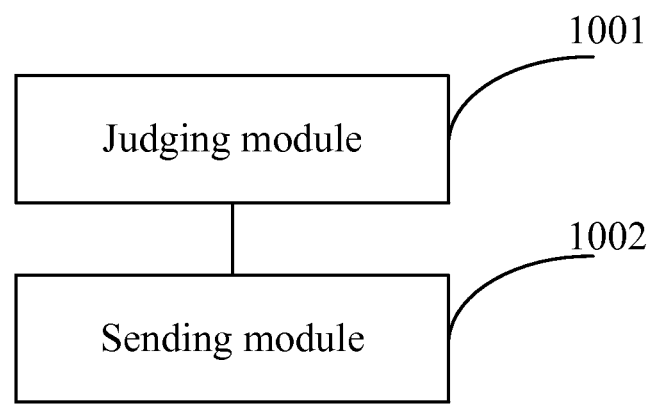
FIG. 10 is a structure diagram of a network side device of Embodiment 7 of the present invention.

Embodiment 7 of the present invention provides a network side device, as shown in FIG. 10, comprising:

Judging module 1001, is used for judging whether the aggregated cell of a UE needs to be changed in the cell set in which the carriers can be aggregated. Therein, the aggregated cell of the UE changing in the cell set in which the carriers can be aggregated, comprises one or several of the following contents: the main serving cell of the UE changing in the cell set in which the carriers can be aggregated; the serving cell of the UE changing in the cell set in which the carriers can be aggregated; the anchor cell of the UE changing in the cell set in which the carriers can be aggregated; all or part of the aggregated cells of the UE changing in the cell set in which the carriers can be aggregated. Further, all or part of the aggregated cells of the UE changing in the cell set in which the carriers can be aggregated, comprises one or several of the following contents: adding new cell(s) to the aggregated cell of the UE; deleting cell(s) from the aggregated cell of the UE; changing configuration information of all or part of the cells comprised in the aggregated of the UE.

Specifically, the judging module 1001 is specifically used for judging whether the aggregated cell of the UE needs to be changed in the cell set in which the carriers can be aggregated according to the measurement report of UE; or, judging whether the aggregated cell of the UE needs to be changed in the cell set in which the carriers can be aggregated according to the load of each cell in the cell set in which the carriers can be aggregated; or, judging whether the aggregated cell of the UE needs to be changed in the cell set in which the carriers can be aggregated according to the service requirements of UE.

Sending module 1002, is used for transmitting RRC connection reconfiguration message to said UE when the judgment result of the judging module 1001 is that the aggregated cell of the UE needs to be changed in the cell set in which the carriers can be aggregated, and said RRC connection reconfiguration message carries the change information of the aggregated cell of the UE; so that the UE reconfigures aggregated cell according to RRC connection reconfiguration message. Therein, the change information of the aggregated cell of the UE, comprising one or several of the following contents: the corresponding frequency information or frequency information index of the changed aggregated cell; the corresponding carrier configuration information of the changed aggregated cell; the corresponding frequency configuration information of the changed aggregated cell; the corresponding system information of the changed aggregated cell; the corresponding carrier identifier of the changed aggregated cell; the corresponding cell identifier of the changed aggregated cell; identifier information of the changed serving cell and/or main serving cell. Further, said corresponding cell identifier of the changed aggregated cell, comprising one or several of the following contents: the corresponding physical layer cell ID of the aggregated cell; the corresponding E-UTRAN cell global ID of the aggregated cell; the corresponding cell ID of the aggregated cell.

Therein, the sending module 1002 is further used for, transmitting the RRC connection reconfiguration message, which carries the corresponding MAC layer reconfiguration information and/or physical layer reconfiguration information of the changed aggregated cell, to the UE, so that the UE reconfigures MAC layer entity and/or physical layer entity according to MAC layer reconfiguration information and/or physical layer reconfiguration information in said RRC connection reconfiguration message.

The sending module 1002 is further used for, transmitting RRC connection reconfiguration message, which carries change information of aggregated cell of UE instead of carrying mobility control information and security configuration information, to said UE; so that said UE uses the AS key which is used before receiving said RRC connection configuration message for security handling.

In addition, in the network side device of present invention, said judging module 1001 is further used for, judging whether the UE needs to perform random access procedure; said sending module 1002 is further used for, transmitting RRC connection reconfiguration message, which carries random access instruction information, to said UE; the random access instruction information is used for indicating UE whether to perform random access procedure.

Further, the sending module 1002 is further used for, when the judgment result of said judging module is positive, assigning preamble which is used for performing random access procedure by said UE, and transmitting the identifier information of preamble to said UE via the RRC connection reconfiguration messages.

In which, various modules of the device provided by the present invention can be integrated in one, also can be disposed separately. Above modules can be combined into one module, further can be separated into multiple sub modules.

Figure 11:
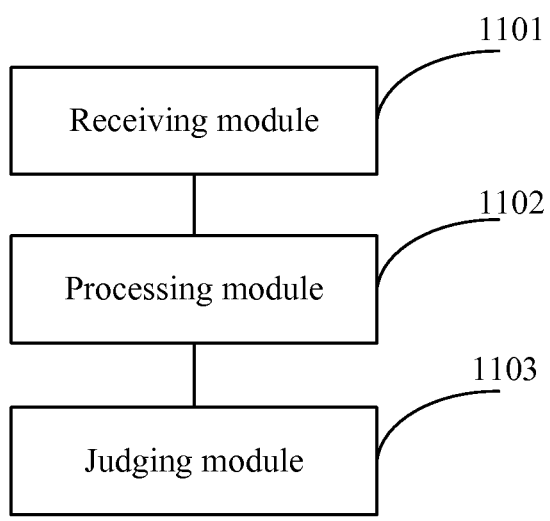
FIG. 11 is a structure diagram of a user equipment of Embodiment 8 of the present invention.

Embodiment 8 of the present invention provides a user equipment UE, as shown in FIG. 11, comprising:

Receiving module 1101, is used for receiving RRC connection reconfiguration message from said network side device when network side device judging that the aggregated cell of the UE needs to be changed in the cell set in which the carriers can be aggregated; and said RRC connection reconfiguration message carries change information of the aggregated cell of the UE. Therein, the aggregated cell of the UE changing in the cell set in which the carriers can be aggregated, comprises one or several of the following contents: the main serving cell of the UE changing in the cell set in which the carriers can be aggregated; the serving cell of the UE changing in the cell set in which the carriers can be aggregated; the anchor cell of the UE changing in the cell set in which the carriers can be aggregated; all or part of the aggregated cells of the UE changing in the cell set in which the carriers can be aggregated. Further, all or part of the aggregated cells of the UE changing in the cell set in which the carriers can be aggregated, comprises one or several of the following contents: adding new cell(s) to the aggregated cell of the UE; deleting cell(s) from the aggregated cell of the UE; changing configuration information of all or part of the cells comprised in the aggregated of the UE.

In addition, the change information of the aggregated cell of the UE, comprising one or several of the following contents: the corresponding frequency information or frequency information index of the changed aggregated cell; the corresponding carrier configuration information of the changed aggregated cell; the corresponding frequency configuration information of the changed aggregated cell; the corresponding system information of the changed aggregated cell; the corresponding carrier identifier of the changed aggregated cell; the corresponding cell identifier of the changed aggregated cell; identifier information of the changed serving cell and/or main serving cell. Further, said corresponding cell identifier of the changed aggregated cell, comprising one or several of the following contents: the corresponding physical layer cell ID of the aggregated cell; the corresponding E-UTRAN cell global ID of the aggregated cell; the corresponding cell ID of the aggregated cell.

Processing module 1102 is used for reconfiguring aggregated cell according to RRC connection reconfiguration message which is received by the receiving modulel 101.

The change information of the aggregated cell of said UE, comprising: the corresponding MAC layer reconfiguration information and/or physical layer reconfiguration information of the changed aggregated cell. change information of the aggregated cell of said UE, comprising: the corresponding MAC layer reconfiguration information and/or physical layer reconfiguration information of the changed aggregated cell, the processing module 1102 is further used for, reconfiguring MAC layer entity and/or physical layer entity, according to MAC layer reconfiguration information and/or physical layer reconfiguration information in said RRC connection reconfiguration message.

When the network side device transmits RRC connection reconfiguration message, which carries change information of aggregated cell of UE instead of carrying mobility control information and of security configuration information, to said UE, the processing module 1102 is further used for, using the AS key which is used before receiving the RRC connection configuration message for security handling, and transmitting reconfiguration complete message to said network side device, to enable the uninterrupted transmission for the data.

The disposing module 1102 is specifically used for using KUPenc key in AS key which is used before receiving the RRC connection configuration message for data encryption and decryption; Using KRRCint key in AS key which is used before receiving said RRC connection configuration message for integrity protection and verification of RRC signalling; Using KRRCenc key in AS key which is used before receiving said RRC connection configuration message for RRC signalling encryption and decryption.

Specifically, is specifically used for performing one or several of the following contents: configuring the corresponding MAC layer entity and/or physical layer entity for the new added aggregated cell; deleting or reconfiguring the corresponding MAC layer entity and/or physical layer entity of the cell which is deleted from original aggregated cell; reconfiguring the corresponding MAC layer entity and/or physical layer entity of the cell which is still used in original aggregated cell.

Judging module 1103, is used for judging whether to start random access procedure; when the judgment result is positive, performing random access procedure; when the judgment result is negative, omitting random access procedure. Besides, the judging module 1103 is further used for judging whether to start random access procedure, according to said RRC connection reconfiguration message carrying random access instruction information or not.

In which, various modules of the device provided by the present invention can be integrated in one, also can be disposed separately. Above modules can combined into one module, further can be separated into multiple sub modules.

A system for reconfiguring an aggregated cell of embodiment of the present invention, comprising:

Network side device, is used for judging whether the aggregated cell of UE needs to be changed in the cell set in which the carriers can be aggregated; when the judgment result is need to change, transmitting RRC connection reconfiguration message to said UE, said RRC connection reconfiguration message carrying the change information of the aggregated cell of said UE. Therein, the aggregated cell of the UE changing in the cell set in which the carriers can be aggregated, comprises one or several of the following contents: the main serving cell of the UE changing in the cell set in which the carriers can be aggregated; the serving cell of the UE changing in the cell set in which the carriers can be aggregated; the anchor cell of the UE changing in the cell set in which the carriers can be aggregated; all or part of the aggregated cells of the UE changing in the cell set in which the carriers can be aggregated. Further, all or part of the aggregated cells of the UE changing in the cell set in which the carriers can be aggregated, comprises one or several of the following contents: adding new cell(s) to the aggregated cell of the UE; deleting cell(s) from the aggregated cell of the UE; changing configuration information of all or part of the cells comprised in the aggregated of the UE.

UE is used for receiving said RRC connection reconfiguration message, and reconfiguring the aggregated cell according to said RRC connection reconfiguration message.

It is obvious that, by using the method provided by the present invention, for LTE-A system, when the aggregated cell of the UE supports the carrier aggregation changes in the same cell set in which the carriers can be aggregated, the aggregated cell of the UE can be reconfigured; and the same AS key can also be used to perform the security processing procedure for the data, so as to avoid the problem of data transmission interrupt and data loss caused by frequent handover when the aggregated cell (carrier) of UE changes in the same cell set in which the carriers can be aggregated, which enables the uninterrupted transmission for the data.

Through the description of the embodiments above, the technical personnel in this field can understand clearly that the present invention can be implemented by software and necessary current hardware platform, of course, can also be accomplished by hardware, but in many cases the former is better implementation mode. Based on this understanding, the technical program of the present invention essentially or can be called contributing part for existing technology can be formed by a form of software products, the software products stored in a storage medium, including a number of instructions for making a computer device (such as personal computers, servers, or network equipments, etc.) implement the methods described in the embodiments of the present invention.

The technical personnel in this field can understand that figure is the sketch map of optimized embodiments, the modules or processes of figures are not necessarily required for performing the present invention.

The technical personnel in this field can understand that the modules of the device of embodiments can distribute in the device of embodiments and also can perform corresponding changes when locating in one or more device of the embodiments of the present invention. The modules of above embodiments can be combined into one module, further can be separated into multiple sub modules.

The above serial number of embodiments of the present invention is only for describing, and doesn't represent that the embodiment is good or bad.

The above embodiments are only part of the embodiments of the present invention, however, the embodiments of the present invention isn't limited to the above embodiments. Any change that the technical personnel in this field can think of should be belong to the scope of the patent protection of the embodiments of the present invention.

The invention claimed is:

1. A method for reconfiguring aggregated cell, comprising:
   a network side device judges whether the aggregated cell of a user equipment (UE) needs to be changed in the cell set in which the carriers can be aggregated;
   when the judgment result is that the change is needed, the network side device transmits a radio resource control (RRC) connection reconfiguration message to the UE, and the RRC connection reconfiguration message carries the change information of the aggregated cell of the UE;
   the UE receives the RRC connection reconfiguration message, and reconfigures the aggregated cell according to the RRC connection reconfiguration message; wherein
   the aggregated cell of the UE changes in the cell set in which the carriers can be aggregated, comprising one or several of the following contents:
   the main serving cell of the UE changes in the cell set in which the carriers can be aggregated; the serving cell of the UE changes in the cell set in which the carriers can be aggregated; the anchor cell of the UE changes in the cell set in which the carriers can be aggregated; all or part of aggregated cells of the UE change in the cell set in which the carriers can be aggregated.

2. The method according to claim 1, wherein all or part of aggregated cells of the UE change in the cell set in which the carriers can be aggregated, comprising one or several of the following contents: adding one or more new cells to the aggregated cell of the UE; deleting one or more cells from the aggregated cell of the UE; changing configuration information of all or part of cells comprised in the aggregated cell of the UE.

3. The method according to claim 1, wherein, the network side device judges whether the aggregated cell of a UE needs to be changed in the cell set in which the carriers can be aggregated, comprising:
   the network side device judges whether the aggregated cell of UE needs to be changed in the cell set in which the carriers can be aggregated according to measurement report of the UE; or,
   the network side device judges whether the aggregated cell of a UE needs to be changed in the cell set in which the carriers can be aggregated according to the load of each cell in the cell set in which the carriers can be aggregated; or,
   the network side device judges whether the aggregated cell of a UE needs to be changed in the cell set in which the carriers can be aggregated according to service requirements of UE.

4. The method according to claim 1, wherein the change information of the aggregated cell of the UE, comprising one or several of the following contents:
   the corresponding frequency information or frequency information index of the changed aggregated cell; the corresponding carrier configuration information of the changed aggregated cell; the corresponding frequency configuration information of the changed aggregated cell; the corresponding system information of the changed aggregated cell; the corresponding carrier identifier of the changed aggregated cell; the corresponding cell identifier of the changed aggregated cell; identifier information of the changed serving cell and/or main serving cell.

5. The method according to claim 4, wherein the corresponding cell identifier of the changed aggregated cell, comprising one or several of the following contents:
   the corresponding physical layer cell ID of the aggregated cell; the corresponding E-UTRAN cell global ID of the aggregated cell; the corresponding cell ID of the aggregated cell.

6. The method according to claim 1, wherein the change information of aggregated cell of the UE, further comprising:
   the corresponding MAC layer reconfiguration information and/or physical layer reconfiguration information of the changed aggregated cell.

7. The method according to claim 6, wherein when the change information of the aggregated cell of the UE carries the corresponding MAC layer reconfiguration information and/or physical layer reconfiguration information of the changed aggregated cell, after the network side device transmits RRC connection reconfiguration message to the UE, further comprising:
the UE reconfigures MAC layer entity and/or physical layer entity, according to MAC layer reconfiguration information and/or physical layer reconfiguration information in the RRC connection reconfiguration information.

8. The method according to claim 1, wherein the network side device transmits RRC connection reconfiguration message to the UE, further comprising:
the network side device transmits RRC connection reconfiguration message, which carries change information of aggregated cell of LIE instead of carrying mobility control information and security configuration information to the UE.

9. The method according to claim 8, wherein after the network the device transmits RRC connection reconfiguration message, which carries change information of aggregated cell of UE instead of carrying mobility control information and security configuration information to the UE, further comprising:
the UE uses AS key which is used before receiving the RRC connection configuration message for security handling, and transmits reconfiguration complete message to the network side device, to enable the uninterrupted transmission for the data.

10. The method according to claim 9, wherein the UE uses the AS key which is used before receiving the RRC connection configuration message for security handling, comprising one or several of the following contents:
the UE uses KUPenc key in AS key which is used before receiving the RRC connection configuration message for data encryption and decryption;
the UE uses KRRCint key in AS key which is used before receiving the RRC connection configuration message for integrity protection and verification of RRC signalling;
the UE uses KRRCenc key in AS key which is used before receiving the RRC connection configuration message for RRC signalling encryption and decryption.

11. The method according to claim 1, wherein after reconfigures the aggregated cell according to the RRC connection reconfiguration message, further comprising:
the UE judges whether to perform random access procedure; when the judgment result is positive, performing random access procedure; when the judgment result is negative, omitting random access procedure.

12. The method according to claim 11, wherein before the network side device transmits RRC connection reconfiguration message to the UE, further comprising:
the network side device judges whether the UE needs to perform random access procedure, and transmits RRC connection reconfiguration message which carries random access instruction information to the UE; the random access instruction information is used for indicating UE whether to perform random access procedure.

13. The method according to claim 12, wherein after the network side device judges whether the UE needs to perform random access procedure, further comprising:
when the judgment result is positive, the network side device assigns preamble which is used for performing random access by the UE, and transmits the identifier information of preamble to the UE via RRC connection reconfiguration messages.

14. The method according to claim 12 or 13, wherein the UE judges whether to perform random access procedure, further comprising:
the UE judges whether to start random access procedure, according to the RRC connection reconfiguration message carrying random access instruction information or not.

15. The method according to claim 1, wherein reconfigures the aggregated cell according to the RRC connection reconfiguration message, comprising one or several of the following contents:
the UE configures the corresponding MAC layer entity and/or physical layer entity for the cell which is added to the aggregated cell;
the UE deletes or reconfigures the corresponding MAC layer entity and/or physical layer entity of the cell which is deleted from original aggregated cell;
the UE reconfigures the corresponding MAC layer entity and/or physical layer entity for the cell which is still used in original aggregated cell.

16. A network side device, comprising:
a judging module, configured to judge whether the aggregated cell of a UE needs to be changed in the cell set in which the carriers can be aggregated, the aggregated cell of the UE changes in the cell set in which the carriers can be aggregated, comprising one or several of the following contents: the main serving cell of the UE changes in the cell set in which the carriers can be aggregated; the serving cell of the UE changes in the cell set in which the carriers can be aggregated; the anchor cell of the UE changes in the cell set in which the carriers can be aggregated; all or part of aggregated cells of the UE change in the cell set in which the carriers can be aggregated;
a sending module, configured to transmit RRC connection reconfiguration message to the UE when the judgment result of the judging module is that the aggregated cell of the UE needs to be changed in the cell set in which the carriers can be aggregated, and the RRC connection reconfiguration message carries the change information of the aggregated cell of the UE; so that the UE reconfigures aggregated cell according to RRC connection reconfiguration message.

17. The network side device according to claim 16, wherein,
the judging module is specifically configured to,
judge whether the aggregated cell of the UE needs to be changed in the cell set in which the carriers can be aggregated according to the measurement report of UE;
judge whether the aggregated cell of the UE needs to be changed in the cell set in which the carriers can be aggregated according to the load of each cell in the cell set in which the carriers can be aggregated;
judge whether the aggregated cell of the UE needs to be changed in the cell set in which the carriers can be aggregated according to the service requirements of UE.

18. The network side device according to claim 16, wherein
the sending module is further configured to, transmit the RRC connection reconfiguration message, which carries the corresponding MAC layer reconfiguration information and/or physical layer reconfiguration information of the changed aggregated cell, to the UE, so that the UE reconfigures MAC layer entity and/or physical layer entity according to MAC layer reconfiguration information and/or physical layer reconfiguration information in the RRC connection reconfiguration message.

19. The network side device according to claim 16, wherein
the sending module is further configured to, transmit RRC connection reconfiguration message, which carries change information of aggregated cell of UE instead of carrying mobility control information and security configuration information, to the UE; so that the UE uses AS key which is used before receiving the RRC connection configuration message for security handling.

20. The network side device according to claim 16, wherein
the judging module is further configured to, judge whether the UE needs to perform random access procedure;
the sending module is further configured to, transmit RRC connection reconfiguration message, which carries random access instruction information, to the UE; the random access instruction information is used for indicating UE whether to perform random access procedure.

21. The network side device according to claim 20, wherein
the sending module is further configured to, when the judgment result of the judging module is positive, assign preamble which is used for performing random access procedure by the UE, and transmit the identifier information of preamble to the UE via the RRC connection reconfiguration messages.

22. A user equipment UE, comprising:
a receiving module, configured to receive RRC connection reconfiguration message from the network side device when network side device judging that the aggregated cell of the UE needs to be changed in the cell set in which the carriers can be aggregated; and the RRC connection reconfiguration message carries change information of the aggregated cell of the UE, wherein the aggregated cell of the UE changes in the cell set in which the carriers can be aggregated, comprising one or several of the following contents: the main serving cell of the UE changes in the cell set in which the carriers can be aggregated; the serving cell of the UE changes in the cell set in which the carriers can be aggregated; the anchor cell of the UE changes in the cell set in which the carriers can be aggregated; all or part of aggregated cells of the UE change in the cell set in which the carriers can be aggregated;
a processing module, configured to reconfigure aggregated cell according to RRC connection reconfiguration message which is received by the receiving module.

23. The UE according to claim 22, wherein, change information of the aggregated cell of said UE, comprising: the corresponding MAC layer reconfiguration information and/or physical layer reconfiguration information of the changed aggregated cell;
when the change information of the aggregated cell of the UE carries the corresponding MAC layer reconfiguration information and/or physical layer reconfiguration information of the aggregated changed cell,
the processing module is further configured to reconfigure MAC layer entity and/or physical layer entity, according to MAC layer reconfiguration information and/or physical layer reconfiguration information in the RRC connection reconfiguration message.

24. The UE according to claim 22, wherein when the network side device transmits RRC connection reconfiguration message, which carries change information of aggregated cell of UE instead of carrying mobility control information and of security configuration information, to the UE,
the processing module is further configured to, use AS key which is used before receiving the RRC connection configuration message for security handling, and transmit reconfiguration complete message to the network side device, to enable the uninterrupted transmission for the data;
and the processing module is specifically configured to,
use KUPenc key in AS key which is used before receiving the RRC connection configuration message for data encryption and decryption;
use KRRCint key in AS key which is used before receiving the RRC connection configuration message for integrity protection and verification of RRC signalling;
use KRRCenc key in AS key which is used before receiving the RRC connection configuration message for RRC signalling encryption and decryption.

25. The UE according to claim 22, wherein further comprising:
a judging module, configured to judge whether to start random access procedure; when the judgment result is positive, performing random access procedure; when the judgment result is negative, omitting random access procedure; and
judge whether to start random access procedure, according to the RRC connection reconfiguration message carrying random access instruction information or not.

26. The UE according to claim 22, wherein
the processing module is specifically configured to perform one or several of the following contents:
configuring the corresponding MAC layer entity and/or physical layer entity for the new added aggregated cell;
deleting or reconfiguring the corresponding MAC layer entity and/or physical layer entity of the cell which is deleted from original aggregated cell;
reconfiguring the corresponding MAC layer entity and/or physical layer entity for the cell which is still used in original aggregated cell.

27. A system for reconfiguring aggregated cell, comprising:
a network side device, configured to judge whether the aggregated cell of UE needs to be changed in the cell set in which the carriers can be aggregated; when the judgment result is need to change, transmitting RRC connection reconfiguration message to the UE, the RRC connection reconfiguration message carrying the change information of the aggregated cell of the UE, wherein the aggregated cell of the UE changes in the cell set in which the carriers can be aggregated, comprising one or several of the following contents: the main serving cell of the UE changes in the cell set in which the carriers can be aggregated; the serving cell of the UE changes in the cell set in which the carriers can be aggregated; the anchor cell of the UE changes in the cell set in which the carriers can be aggregated; all or part of aggregated cells of the UE change in the cell set in which the carriers can be aggregated;
a UE, configured to receive the RRC connection reconfiguration message, and reconfigure the aggregated cell according to the RRC connection reconfiguration message.

* * * * *